Sept. 9, 1958　　　P. H. HARRER　　　2,850,964
ROTARY BALER

Filed Sept. 12, 1955　　　3 Sheets-Sheet 1

Inventor
Paul H. Harrer
By Kenneth Blackwell
Attorney

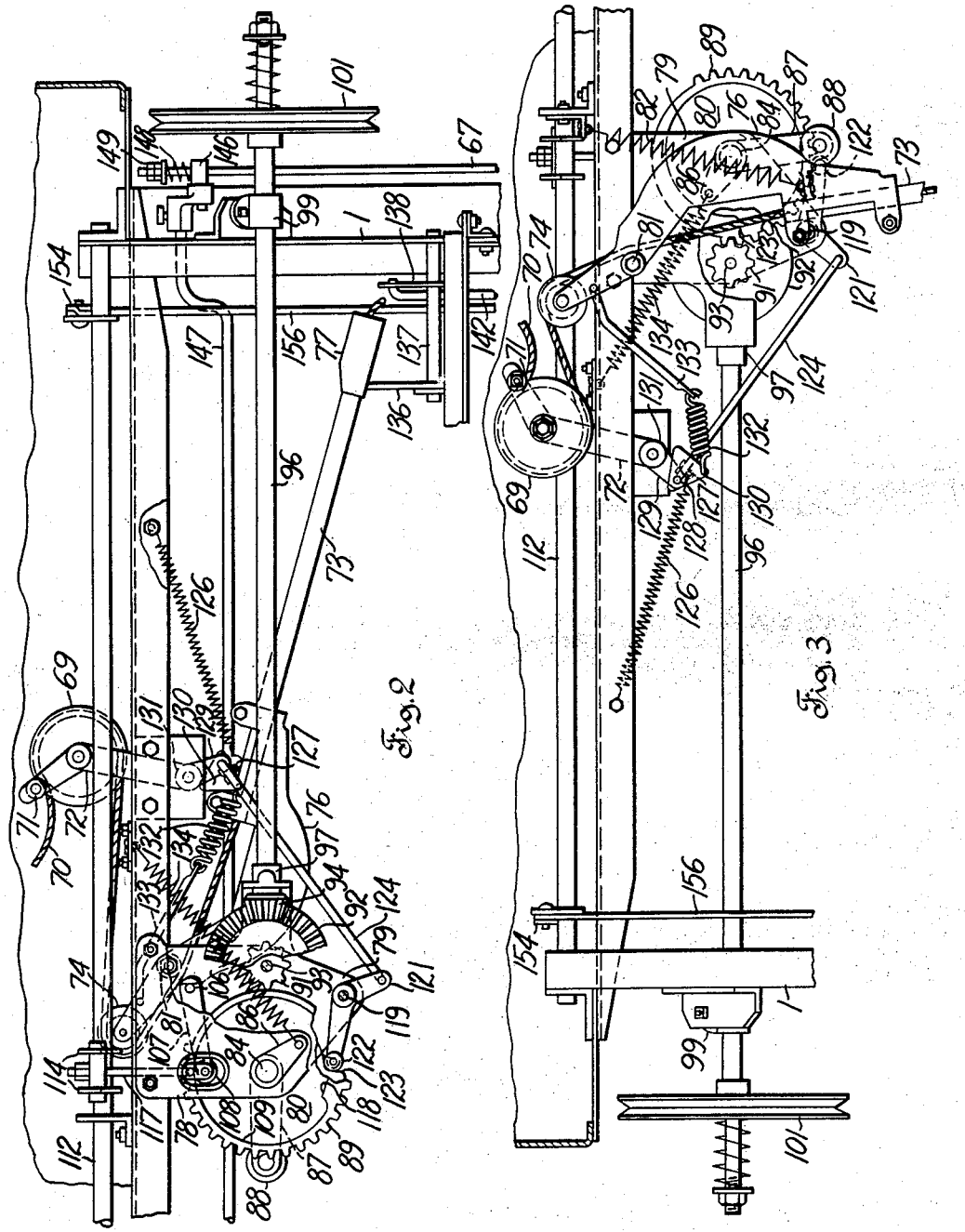

United States Patent Office 2,850,964
Patented Sept. 9, 1958

2,850,964

ROTARY BALER

Paul H. Harrer, La Porte, Ind., assignor to Allis-Chalmers Manufacturing Company, Milwaukee, Wis.

Application September 12, 1955, Serial No. 533,638

7 Claims. (Cl. 100—5)

This invention relates to baling machines of the type embodying means for rolling material delivered thereto into a formed cylindrical bale of predetermined diameter and more particularly to an improved mechanism for wrapping material (hereinafter called twine) around the formed cylindrical bale while it is in the machine of the type as shown and described in C. J. Scranton and P. H. Harrer, U. S. 2,468,641 dated April 26, 1949.

The primary object of this invention is to provide an improved mechanism positively responsive to the dropping of a twine feeding tube to twine feeding position for driving the twine tube through its wrapping cycle.

A further object of this invention is to provide a positive and automatic trip operated by the movement of a twine tube to a twine feeding position to start a bale wrapping cycle independent of any action of the twine.

Rotary baling machines in the prior art were dependent upon tension in the twine for initiating the bale wrapping operation. There are various reasons why a malfunction of the baling machine may occur and result in the twine failing to be tensioned. This could happen as a result of twine breakage; the wind blowing the twine end away from its place of engagement between the press roll and drive roll; lack of material on the conveyer which ordinarily moves the end of the twine into contact with the bale; and for lack of twine. Under any of these conditions the baling mechanism keeps rotating the bale with no wrapping of twine taking place.

The present invention overcome this difficulty experienced in prior art machines by positively driving the twine tube through its wrapping cycle each time the twine tube has been dropped to twine feeding position and this is true even though there is no twine in the machine. The last mentioned idea of baling without wrapping twine about the bales is practiced in some parts of the country and with embodiments of this invention this mode of operation can readily be accomplished.

Another object of this invention is to provide a safer rotary baling machine. In the past, some operators of baling machines have been injured when negligently attempting to insert twine between the press roll and lower drive roll. It has also been found that even if the twine has not initially caught between the rolls, the movement of the twine tube past the bight of these rolls often results in the twine catching. In any event, even if the twine does not catch, with embodiments of this invention the only thing that can happen is to have a bale discharged which has not been twine wrapped.

These and other objects and advantages will become apparent as the description progresses and particularly points out other features not previously mentioned.

Accordingly, the invention may be considered as consisting of the various details of construction, correlations of features and arrangements of parts as is more fully set forth in the attached description and in the appended claims, reference being had to the accompanying drawings, in which:

Fig. 2 is a partial enlarged front elevation of that portion of the baler embodying twine wrapping and bale discharge control mechanism with the twine tube shown in raised or first position and with some parts broken away;

Fig. 3 is a partial enlarged rear elevation of the twine wrapping mechanism shown in Fig. 2 with the twine tube shown in lowered or second position and with some parts broken away.

Figure 1:
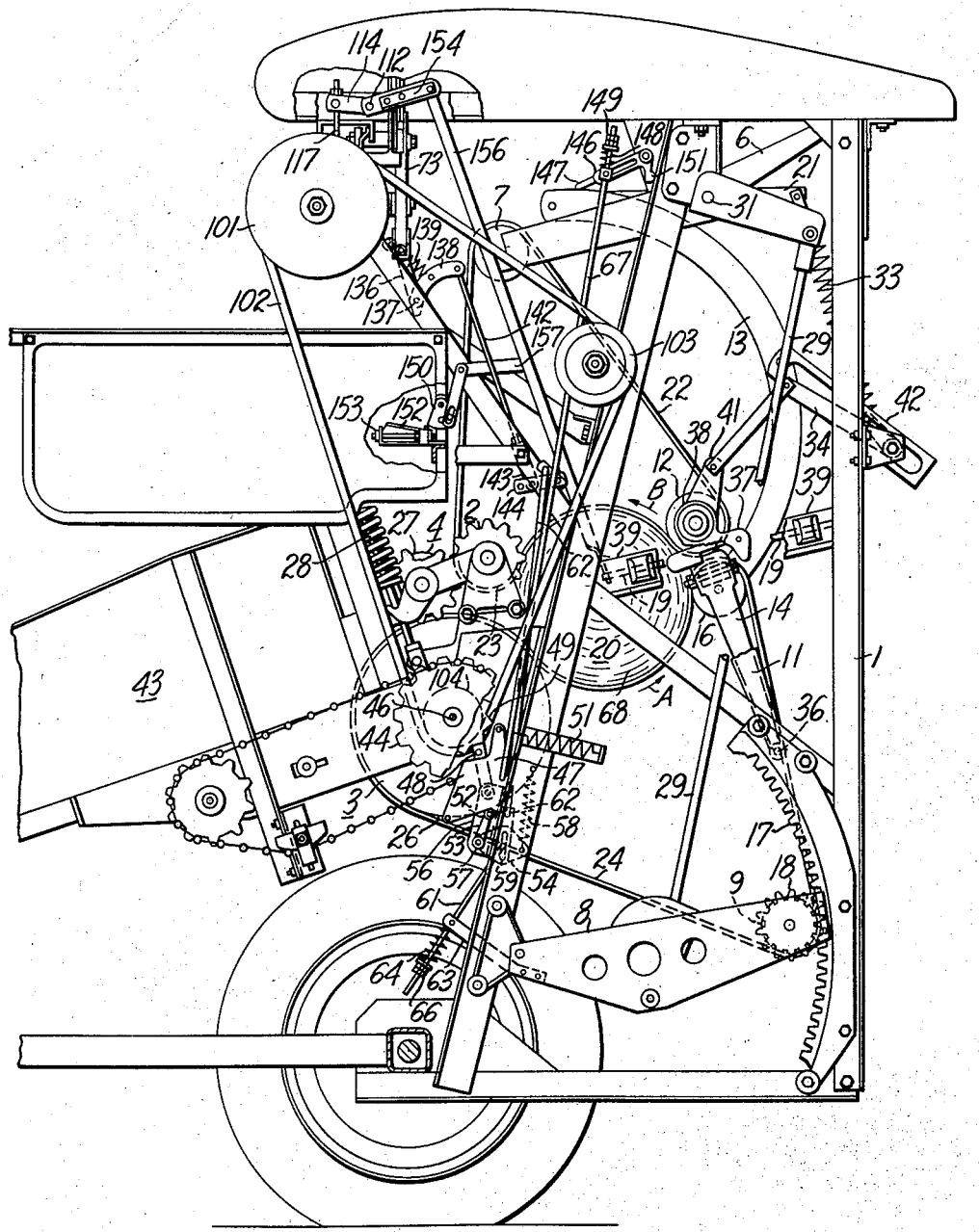
Fig. 1 is a partial side elevation of a rotary baler embodying the invention with some parts broken away.

Referring to Fig. 1 it is seen that the invention may be applied to a wheel supported baling machine comprising a frame structure operatively mounting an upper drive roll assembly 2, a lower drive roll assembly 3, a press roll assembly 4, upper and lower tension roll assemblies including pivotally supported tension arms 6 and 8 rotatably mounting rolls 7 and 9, respectively; an upper trip roll assembly including an arm 11 rotatably supporting a roll 12, a lower trip roll assembly including a hanger or bow member 13 supporting at its lower end an arm 14 which in turn rotatably mounts a roll 16, an arcuate rack 17 with which is engaged a pinion 18 carried by the adjacent end of lower tension arm 8, a pivoted latch release bar 19, and a discharge rocker arm 21 which is pivotally connected at one end to bow member 13.

A bale rotating mechanism 20 includes one or more endless bale forming bands 22 which are mounted for movement over the roll portion 23 of drive assembly 2, over the roll 7 of the upper tension assembly, and over the roll 12 of the upper trip assembly. Also, one or more endless bale forming bands 24 are mounted for movement over the roll portion 26 of drive assembly 3, over the roll 9 of the lower tension assembly, and over the roll 16 of the lower trip assembly; the bands being driven in the same direction by the roll portions of the drive assemblies as shown by arrows A and B in Fig. 1, and the roll portion 27 of assembly 4 is preferably releasably held in engagement with the roll portion 26 of lower drive assembly 3 by means or one or more springs 28.

The upper and lower tension arms 6 and 8 are pivotally interconnected for simultaneous angular movement by means of a rod 29 and the upper tension arm 6 and discharge rocker arm 21 are mounted for relative angular movement about a common fulcrum 31, arm 6 being biased by a spring (not shown) for clockwise movement about said fulcrum, and arm 21 being biased in a clockwise direction about fulcrum 31 by means of a spring 33 having its one end connected with one arm of a bell crank lever 34 and having its other end connected with the adjacent end of arm 21. Trip roll arms 11 and 14 are pivotally interconnected at 36 for relative angular movement and these arms are normally retained locked in the aligned position shown by means of a releaseable latch 37 carried by arm 11 in a position to engage a portion of the arm 14. Arm 11 also has mounted thereon a flanged wheel 38 adapted to engage and roll along the top surface of an inclined frame member 39 by means of a link 41 connecting the upper end of arm 11 with an arm of bell crank lever 34. Movement of bow member 13 toward the lower drive roll assembly is limited by a looped link 42 connected as shown.

Material to be baled is delivered to a point adjacent the roll portions of press roll assembly 4 and lower drive roll assembly 3 by means of a pickup conveyor 43 which is chain driven from a sprocket 44 operatively mounted on a normally rotating shaft 46 forming a part of the lower drive roll assembly 3; the relation between sprocket 44 and shaft 46 being such that when a pivotally mounted latch plate 47 is positioned with a pawl 48 thereon engaged with ratchet like surface 49, the sprocket 44 drives conveyer 43, and that when latch plate 47 is moved to a pawl disengaging position by the action of spring 51, the sprocket 44 becomes stationary. Latch plate 47 is normally retained positioned to engage pawl 48 with ratchet like surface 49 by means of a roller 52 carried by a crank arm 53; arm 53 and a plate 54 being integrally connected and pivotally mounted on a frame bracket 56 for angular movement about a common pivot 57. A spring 58 acts to retain arm 53 and plate 54 in the position shown. The plate 54 is provided with an elongated opening 59 therethrough in which is positioned the upper turned over end of a downwardly extending link 61. An upwardly extending link 62 has its lower end pivotally connected with the adjacent lower end of link 61 for movement therewith. The lower end of link 61 is interconnected with a strap 63 on the adjacent end of lower tension arm 8 by means of an interposed spring 64, and spring positioning nuts 66. The position of spring 64 determines the extent lower tension arm 8 must move in an anticlockwise direction from its initial starting position in order to actuate crank arm 53 and effect the release of latch plate 47 which can be readily returned to its shown position with pawl 48 engaging ratchet like surface 49 by means of a link 67 having its lower turned over end pivotally connected with plate 47.

The correlation of the various parts so far described is the same as that described in the mentioned Scranton et al. patent U. S. 2,468,641 and in Harrer patent U. S. 2,424,821 and reference may be had to these patents if a more complete description is desired. The parts so far described function as follows: material passing between the roll portions of the press roll assembly 4 and the lower drive roll assembly 3 is engaged by bale rotating mechanism 20 including the endless bale forming bands 22 and 24 and rolled into a compact formed cylindrical bale 68, and when the bale attains a desired diameter the conveyer 43 is stopped automatically and the latch release bar 19 is actuated to lift latch 37 on arm 11 whereupon the upper and lower trip roll assemblies move apart ejecting the bale rearward from between the bale forming bands 22 and 24 and out of the machine; the trip and tension assemblies automatically returning to their initial bale starting positions.

Referring to Fig. 2, it is seen that the frame structure 1 also has mounted thereon mechanism for wrapping twine 70 about the formed cylindrical bale, while it is in the machine, including a pair of spring pressed twine tensioning disks 69 (only one of which is shown) and a twine roller 71 both mounted on one arm of a bell crank lever 72 in such relation that the twine roller 71 forces the twine 70 between the disks 69. A reciprocable twine feeding member or tube 73 has on its upper end a twine guide roller 74 for conducting the twine into the tube; an intermediate external cam edge portion 76; and at its lower end a twine feeding ferrule 77 through which the twine passes in leaving the tube. A housing is formed by spaced, rigidly connected and supported front and rear plates 78 and 79, respectively, operatively supporting the twine feed tube, and a cycling or timing mechanism 80, which will be described more fully hereinbelow, is provided for controllably positioning and positively moving the twine feed tube lengthwise of the bale with a substantially uniform horizontal velocity component during the bale wrapping operation.

The twine tube 73 is supported for angular movement by having its upper end pivotally mounted on a fixed pin 81 projecting laterally outward from rear plate 79 and the twine tube is biased by gravity and by the action of a spring 82 (Fig. 3) to assume the position shown in Fig. 3; movement in the anticlockwise direction being limited by engagement with a fixed stop member (not shown) carried by a part of the frame structure 1. Plates 78 and 79 (Fig. 2) are provided with a pair of horizontally aligned bearings in which is rotatably mounted a shaft 84 having exposed front and rear end portions to which are secured arms 86 and 87, respectively, crank arm 87 having mounted on the free end thereof a laterally projecting roller 88 adapted to engage the cam portion 76 of twine tube 73. A spur gear or movable timing element 89 having a nontoothed peripheral portion (hereinafter called a partial gear) is fixed on shaft 84 between the plates 78 and 79 in such a position as to be driven through a predetermined angle by a spur gear 91 integral with the hub portion of a bevel gear 92 rotatably mounted between plates 78 and 79 on a fixed shaft 93 which extends between and is supported by plates 78 and 79. Bevel gear 92 meshes with and is driven by a pinion 94 fixed on a rotary actuating element or shaft 96 which has its adjacent inner end rotatably mounted in a bearing 97 supported by an integral forwardly extending arm (not shown) on rear plate 79. The opposite end of shaft 96 is rotatably supported in a bearing 99 mounted on the frame structure 1 and carries at its outer end a V-belt pulley 101 which, as shown in Fig. 1, is driven by a belt 102 running over an idler pulley 103 mounted on the frame structure and over a drive pulley 104 fixed on one end of shaft 46 of the lower drive roll assembly. The other end of shaft 46 is drivenly connected to a power source not shown.

Front plate 78 (Fig. 2) has fixed thereon a rearwardly projecting fixed pin 106 on which is pivotally mounted a crank arm 107 carrying a laterally projecting roller 108 adapted to engage and ride on the inner peripheral surface 109 of the toothed flange portion of gear 89; arm 107 being biased to maintain roller 108 in continuous engagement with surface 109 by means of an upwardly extending spring (not shown).

A transversely extending shaft 112 is rotatably mounted in bearings carried by opposite side portions of the frame structure 1 and it is provided with a pair of laterally projecting arms 114 (Figs. 1 and 2) which are connected with roller carrying crank arm 107 (Fig. 2) by means of suitable linkage including link 117. Surface 109 is provided with an integral cam portion 118 and the movement of roller 108 thereover results in an anticlockwise movement of crank arm 107 as viewed in Fig. 2, and in a consequent anticlockwise rocking movement of shaft 112 as viewed in Fig. 1.

Plates 78 and 79 also have secured therebetween a fixed shaft 119 (Fig. 2) on which is pivotally mounted a bell crank lever 121 having on one arm thereof a roller 122 adapted to engage a stop projection 123 integral with the rear side of gear 89 and having its other arm connected for simultaneous movement with the downwardly extending arm of the bell crank 72 by means of a link 124. A spring 126 is attached at one end to frame 1 and is attached at the other end to link 124 by means of a cotter pin 127 engaged in an opening therethrough. Link 124 is provided with a turned over end portion 128 (Fig. 3) which is pivotally received in a complementary opening in arm 129 of bell crank 72. A triangular shaped plate 130 is pivotally mounted on end portion 128 and the pivotal movement of this plate is limited by its contact with the hub 131 of bell crank 72. A spring 132 has one end thereof pivotally attached to plate 130. The other end of spring 132 is pivotally connected to a link 133 which is pivotally connected at its other end to twine tube 73.

The unit comprising shaft 84, crank arm 86, crank arm 87, roller 88 and gear 89 is normally retained in the position shown in Fig. 2 by means of a spring 134 having one end fastened to a fixed part of the frame structure 1 and having its other end fastened to the outer end portion of crank 86. The arrangement of parts as shown in Fig. 2 is such that spring 134 tends to rotate shaft 84, partial gear 89 and crank arms 86 and 87 in an anticlockwise direction, but such movement is obstructed by the roller 122 on bell crank lever 121 while said roller is in engagement with the stop projection 123 on partial gear 89. In the condition of the mechanism as shown in Fig. 2 the toothed portion of partial gear 89 is angularly spaced out of meshed relation with respect to the teeth on drive gear 91 and therefore gear 91 is inoperative to drive partial gear 89 anticlockwise. Upon release of roller 122 from stop projection 123, gear 89 is rotated counterclockwise by spring 134 a sufficient distance to engage the first tooth thereon with the constantly rotating gear 91. The twine tube 73 is retained in its raised position by means of a latch 136 fixed on a rod 137 pivotally mounted on the frame structure 1 and biased to the position shown in Fig. 1 by means of an arm 138 (Figs. 1 and 2) fixed on rod 137 and by a spring 139 (Fig. 1) connected with arm 138 and with a fixed part of the frame structure.

Referring again to Fig. 1, it is seen that arm 138 on rod 137 is interconnected with link 62 by means of link 142, its extension 143 and bell crank lever 144 carried by frame 1; bell crank lever 144 having one of its arms connected with the lower end of extension 143 and having its other arm connected with the upper end of link 62.

The actutating link 67 for the conveyor drive latch plate 47 (Figs. 1 and 2) has its upper end connected with an arm 146 fixed on the adjacent end of a pivotally mounted, transversely extending crank bar or rod 147 by means of an interposed spring 148 and spring positioning adjusting nuts 149. Movement of crank rod 147 in an anticlockwise direction (as viewed in Fig. 1) and thereby the movement of link 67 and latch plate 47 in a pawl disengaging direction is limited by the engagement of a stop projection 151 on arm 146 with the adjacent frame structure. Crank rod 147 is positioned to be engaged by the upper end of bow member 13 after a bale has been discharged and as the lower trip roll assembly is returned toward and nears its initial bale starting position and the position of spring 148 determines the extent the rod 147 must be moved clockwise from the position shown in order to actuate link 67 and reposition latch plate 47 and pawl 48 as indicated in Fig. 1. In this connection, the spring position is preferably so adjusted that latch plate 47 and pawl 48 are repositioned to start conveyer 43 just as soon as the trip roll assemblies return to their initial bale starting positions.

Referring once again to Fig. 1, it is seen that frame structure 1 also mounts a fixed twine cutting knife 152 positioned to be engaged by the twine 70 fed from the ferruled end of the tube 73 as it approaches the position shown in Fig. 2, and a pivotally mounted knife guard 153 normally positioned as shown in Fig. 1 to prevent the twine from contacting the knife, and that shaft 112 is also provided with a pair of arms 154 one of which is shown as operatively connected with the adjacent end of latch release bar 19 by means of a link 156. Link 156 is provided with suitable linkage 157 such that an anticlockwise movement of shaft 112 as viewed in Fig. 1 swings latch 150 from above guard 153 upward and away from knife 152 and sequentially actuates latch bar 19 to release latch 37 which normally retains the trip roll assembly arms 11 and 14 locked in alignment.

Assuming that the machine is operating with the various parts positioned as shown in Fig. 1, that is, with conveyer 43 delivering material to the machine and the material passing between the roll portions of the press and drive roll assemblies and then around the partially formed bale 68 disposed therein, causing the upper and lower tension rolls 7 and 9 to move toward each other; that the upper and lower tension arms 6 and 8, respectively, are both moving in an anticlockwise direction about their points of pivotal support; that the upper and lower trip roll assemblies are moving rearward with the flanged wheel 38 in engagement with frame member 39; and that the parts will continue to move as just described until the downward movement of projection 63 on lower tension arm 8 and of link 61 turns crank arm 53 and plate 54 a sufficient distance in a clockwise direction to first release twine tube 73 from latch 136 thereby permitting twine tube 73 to swing downward from the first position shown in Fig. 2 to the second position shown in Fig. 3, and to then release latch plate 47 which is immediately moved to its pawl disengaging position by the action of spring 51.

The bias of springs 82 and 132 causes the twine tube to pivot to the position shown in Fig. 3. As the twine tube 73 approaches this position spring 132 becomes relaxed and spring 126 then becomes operative to move link 124 toward the left and bell crank lever 121 into the drive establishing position in which it is shown in Fig. 3. Since the roller 122 is now out of contact with stop member 123 on gear 89, the spring 134 connected with arm 86 on shaft 84 quickly rotates shaft 84 and thereby arm 87 and gear 89 until the first tooth on gear 89 engages the continuously rotating spur gear 91. When in this position, the roller 88 on arm 87 is positioned in proximate spaced relation to the cam surface 76 on twine tube 73 and the rotation of gear 91 drives gear 89 and thereby shaft 84 and arms 86 and 87 anticlockwise until the various parts reach the position shown in Fig. 2.

During the initial rotation of gear 89 by gear 91, the twine tube 73 remains stationary in the position shown in Fig. 3 until roller 88 on arm 87 engages the cam surface 76 and this delayed action permits one or more turns of twine to be wrapped around the adjacent end of the formed cylindrical bale before the twine tube commences to move lengthwise thereof. The engagement of roller 88 with cam surface 76 moves tube 73 from the position shown in Fig. 3 to the position shown in Fig. 2. The cam being so shaped that when the tube reaches the position shown in Fig. 2, it is held in such position until the latch 136 is repositioned beneath tube 73.

In general, the correlation of parts is such that the tube 73 reaches its raised position just before the cam position portion 118 on the inner peripheral surface 109 of gear 89 engages roller 108 on crank arm 107 and moves said arm downward and that tube 73 is held in its raised position by the roller 88 on crank arm 87 until the cam portion 118 moves away from the roller 108 on arm 107. The downward movement of arm 107 is transmitted through link 117 to shaft 112 which turns in an anticlockwise direction as viewed in Fig. 1 and through the medium of arm 154 and links 156 and 157 permits the guard 153 to move away from knife 152 and sequentially actuates bar 19 to release latch 37 carried by arm 11 of the upper trip roll assembly whereupon the twine scrapes the guard 153 and moves same upward until the twine contacts knife 152 and is severed thereby. The arms 11 and 14 and rolls 12, 16, respectively, of the trip roll assemblies move apart and discharge the bale from the machine and the tension rolls 7 and 9 carried by arms 6 and 8, respectively, move away from each other to their initial bale starting positions; such movements of the tension and trip roll assemblies occurring substantially simultaneously.

As the twine tube 73 moves toward the position shown in Fig. 2 spring 132 becomes tensioned and ultimately overcomes the tension of spring 126 and causes plate 130 to pivot about portion 128 until an end portion of the plate contacts hub 131, at this time spring 132 now moves bell crank 72 in a clockwise direction and link 124 attached thereto is moved toward the left as viewed in Fig. 2. This movement of link 124 swings bell crank 121 into the drive interrupting position in which it is shown in Fig. 2, causing roller 122 to contact blocking member 123 when gear 89 has been revolved around to the position in which it is shown in Fig. 2.

The return of lower tension arm 8 (Fig. 1) to its initial starting position releases the pull on link 61 and as a result links 61, 62, 142 and 143 are immediately moved upward by the action of spring 139. During this phase of the cycle latch plate 47 is held by spring 51 in the position determined by the engagement of stop projection 151 with the adjacent frame structure. This movement of links 61, 62, 142 and 143, which is sufficient to reposition latch 136 beneath twine tube 73 as shown in Fig. 1, takes place during the time interval the tube is held in its fully raised position by roller 88. Shortly after the cam portion 118 (Fig. 2) is disengaged from roller 108, the gear 89 moves out of mesh with drive gear 91 at which time arm 86 moves over center with respect to spring 134 whereupon spring 134 rapidly rotates gear 89 and the parts movable therewith into the position shown in Fig. 2.

Upon discharge of the bale from the machine, the upper and lower trip roll assemblies immediately return to their initial bale starting positions with the arms 11 and 14 locked in alignment by means of latch 37 on arm 11 and this rapid movement of the trip roll assemblies actuates crank rod 147 and thereby link 67 which repositions latch plate 47 and pawl 48 to start the conveyor and again deliver material to the press roll assemblies just as soon as the various bale forming parts are repositioned to receive the material.

Figure 4:
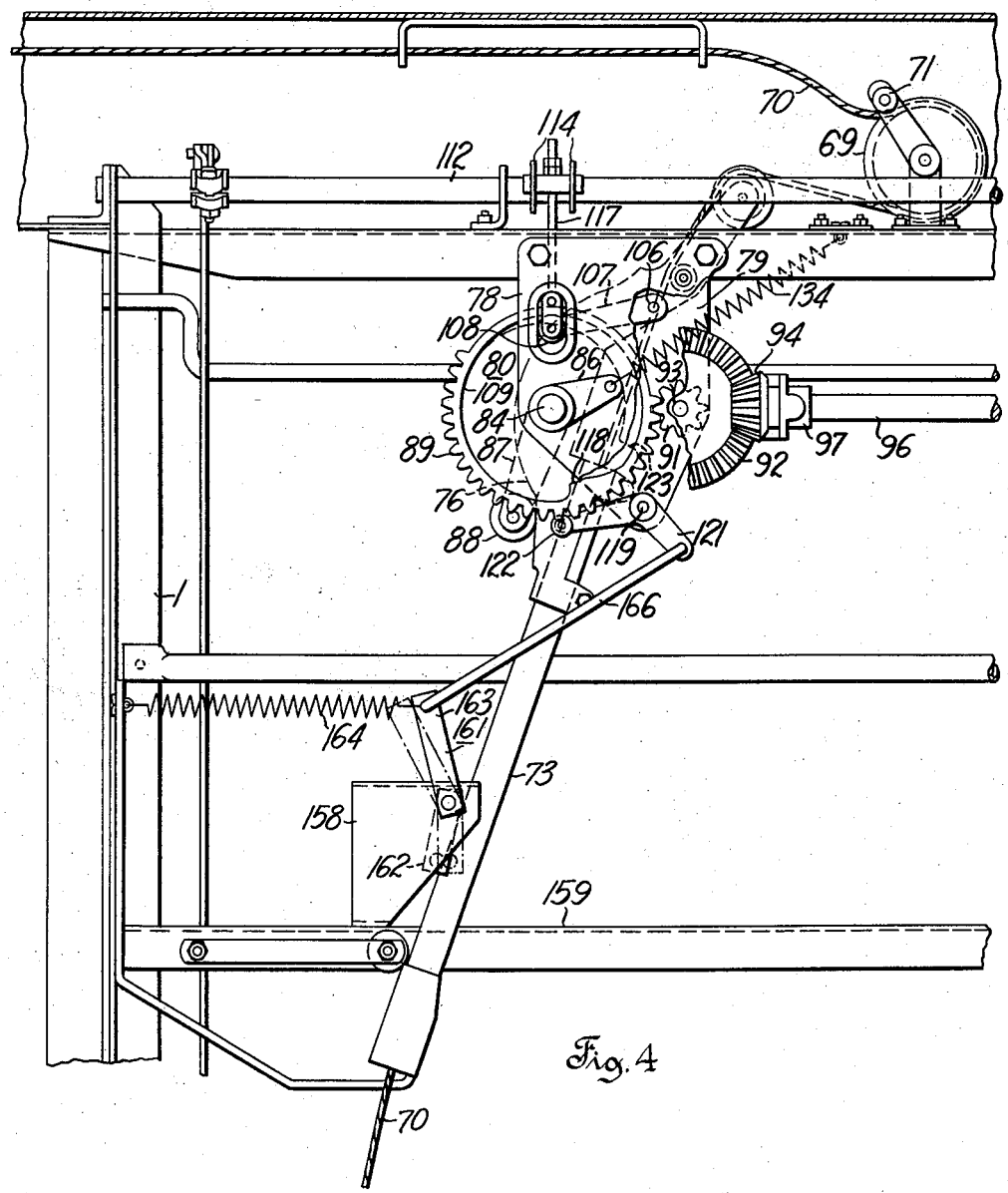
Fig. 4 is an enlarged partial front elevation of a baling machine illustrating another embodiment of the invention with the twine tube shown in lowered or initial twine supplying position.

Referring to Fig. 4, another embodiment of this invention is shown in which a channel bracket 158 is attached to a cross member 159 of baler frame 1. Bracket 158 pivotally supports a bell crank 161 having a lower leg 162 and an upper leg 163. A spring 164 is connected between frame 1 and upper leg 163 for biasing same toward the left as viewed in Fig. 4. A link 166 has the lower end thereof pivotally connected to upper leg 163 and has the upper end thereof connected to one leg of bell crank 121.

The operation of this embodiment shown in Fig. 4 is as follows: when the bale has reached a predetermined size and twine tube 73 is released, the twine tube is biased by a spring (not shown) for moving the twine tube to the position shown in Fig. 4. Twine tube 73 in its descent contacts the lower leg 162 of bell crank 161 and moves same from the dashed line position shown to the full line position against the bias of spring 164. This movement of bell crank 161 produces an upward movement of link 166 and a downward movement of roller 122 attached to bell crank 121. When roller 122 moves downward out of contact with a stop 123 on gear 89, gear 89 biased by spring 134 rotates until it engages with gear 91 to start the twine wrapping cycle as previously described for the embodiment shown in Figs. 1, 2 and 3. As the lower end of the twine tube starts moving to the right as viewed in Fig. 4 as the twine wrapping operation continues, the twine tube loses contact with bell crank 161 and spring 164 pivots bell crank 161 to the dashed line position shown and connected link 166 causes bell crank 121 to reposition roller 122 in position to contact the stop member 123 on gear 89 for preventing further rotation of gear 89 when the twine wrapping cycle has been completed.

Designating the bell crank lever 121 as a control element, it will be noted that actuating means for that control element include a linkage element, as represented by the link 133 in Figs. 2 and 3 or by the lower leg 162 of bell crank lever 161 in Fig. 4, which is operatively interposed between the control element 121 and the twine feeding member 73 so as to transmit motion from the latter to the control element 121 independently of the twine 70.

From the foregoing it is seen that in both embodiments of this invention, apparatus has been provided for positively initiating the twine wrapping cycle entirely independent of the tension in the twine or for that matter whether there is even any twine in the machine.

Machines of this type in the prior art depended on the twine tension to initiate the twine wrapping cycle so if the twine did not become tensioned the wrapping cycle did not take place. With the present invention it is of course obvious that a careful adjustment of the twine tension disks is not necessary.

The invention is applicable in its broadest aspects to all types of rotary baling machines and it should therefore be understood that it is not intended to limit the invention to the exact construction and mode of operation herein shown and described for purposes of illustration as various modifications within the scope of the appended claims may occur to persons skilled in the art.

It is claimed and desired to secure by Letters Patent:

1. In a machine embodying means operative to roll material delivered thereto into a formed cylindrical bale of predetermined diameter and to wrap twine spirally lengthwise around said bale, the combination of a reciprocable twine feeding member movable automatically from a first position adjacent one end of said bale to a second position adjacent the other end of said bale in response to said bale reaching said predetermined diameter; drive means for moving said twine feeding member from said second to said first position in twine feeding relation to said bale; a control element for said drive means selectively movable into drive establishing and drive interrupting positions; and actuating means for said control element including a linkage element operatively interposed between said control element and said twine feeding member so as to transmit motion from the latter to said control element independently of said twine.

2. The combination set forth in claim 1 and further comprising resilient means operatively associated with said control element so as to yieldingly oppose movement of the latter by said linkage element.

3. In a machine embodying means operative to roll material delivered thereto into a formed cylindrical bale of predetermined diameter and to wrap twine spirally lengthwise around said bale, the combination of a reciprocable twine feeding member movable automatically from a first position adjacent one end of said bale to a second position adjacent the other end of said bale in response to said bale reaching said predetermined diameter; drive means for moving said twine feeding member from said second to said first position in twine feeding relation to said bale; a pivoted control element for said drive means swingable in one direction into a drive establishing position and in the opposite direction into a drive interrupting position; spring means biasing said control element in one of said directions; and a linkage element operatively interposed between said control element and said twine feeding member so as to transmit motion from the latter to said control element in opposition to said spring means independently of said twine.

4. In a machine embodying means operative to roll material delivered thereto into a formed cylindrical bale of predetermined diameter and to wrap twine spirally lengthwise around said bale, the combination of a reciprocable twine feeding member movable automatically from a first position adjacent one end of said bale to a second position adjacent the other end of said bale in response to said bale reaching said predetermined diameter; drive means for moving said twine feeding member from said second to said first position in twine feeding relation to said bale; a control element for said drive means reciprocable between drive establishing and drive interrupting positions; spring means biasing said control element toward said drive establishing position; and a linkage element pivoted on said twine feeding member and operatively connected with said control element so as to move the latter in opposition to said spring means into said drive interrupting position upon movement of said twine feeding member from said second toward said first position thereof.

5. The combination as set forth in claim 4 and further comprising a second resilient element operatively interposed between said linkage element and said control element.

6. In a machine embodying means operative to roll material delivered thereto into a formed cylindrical bale of predetermined diameter and to wrap twine spirally lengthwise around said bale, the combination of a reciprocable twine feeding member movable automatically from a first position adjacent one end of said bale to a second position adjacent the other end of said bale in response to said bale reaching said predetermined diameter; drive means for moving said twine feeding member from said second to said first position in twine feeding relation to said bale; a pivoted control element for said drive means reciprocable between drive establishing and drive interrupting positions; spring means biasing said control element toward said drive interrupting position; and actuating means for said control element including a lever engageable by said twine feeding member during movement of the latter toward said second position so as to move said control element in opposition to said spring means into said drive establishing position.

7. The combination as set forth in claim 6, wherein said lever is mounted for pivotal movement on a fixed axis at a predetermined radial spacing from the pivot center of said control element, and further comprising a connecting link operatively interposed between said lever and said control element.

References Cited in the file of this patent

UNITED STATES PATENTS 2,424,821   Harrer _____ July 29, 1947